(12) United States Patent
Sroka et al.

(10) Patent No.: US 12,547,462 B2
(45) Date of Patent: Feb. 10, 2026

(54) MULTI-FEATURE RESOURCE RECOMMENDER SYSTEM FOR PROCESS OPTIMIZATION AND USER PREFERENCE INFERENCE

(71) Applicant: Microsoft Technology Licensing, LLC, Redmond, WA (US)

(72) Inventors: Michal Adam Sroka, Birkerød (DK); Mohammadreza Fani Sani, Lyngby (DK); Shahab Moradi, San Bruno, CA (US); Alejandro Gutierrez Munoz, Parkland, FL (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 700 days.

(21) Appl. No.: 18/059,423

(22) Filed: Nov. 28, 2022

(65) Prior Publication Data
US 2024/0176667 A1 May 30, 2024

(51) Int. Cl.
*G06F 9/50* (2006.01)
*G06F 9/54* (2006.01)

(52) U.S. Cl.
CPC ............ *G06F 9/5033* (2013.01); *G06F 9/542* (2013.01)

(58) Field of Classification Search
CPC .. G06Q 10/06; G06Q 10/06375; G06Q 10/00; G06Q 10/0637; G06Q 10/067; G06F 9/5033; G06F 9/542
See application file for complete search history.

(56) References Cited

U.S. PATENT DOCUMENTS

| | | | |
|---|---|---|---|
| 5,649,085 A * | 7/1997 | Lehr ...................... | G06Q 40/08 715/966 |
| 8,090,621 B1* | 1/2012 | Chakrabarti ....... | G06Q 30/0601 705/26.1 |
| 8,407,081 B1 | 3/2013 | Rajasenan | |
| 10,824,497 B2* | 11/2020 | Wang .................. | G06F 11/0751 |
| 11,100,153 B2 | 8/2021 | Dasgupta et al. | |
| 2014/0129295 A1* | 5/2014 | Band .................. | G06Q 10/0637 705/7.36 |
| 2014/0201506 A1* | 7/2014 | Parashar ............. | G06F 9/30072 712/229 |
| 2014/0207801 A1* | 7/2014 | Palmert ................. | G06F 16/248 707/749 |
| 2015/0032499 A1* | 1/2015 | Duftler .............. | G06Q 10/0633 705/7.27 |

(Continued)

OTHER PUBLICATIONS

Arias, et al., "Human Resource Allocation or Recommendation Based on Multi-factor Criteria in On-demand and Batch Scenarios", In the European Journal of Industrial Engineering, vol. 12, Issue 3, May 25, 2018, pp. 364-404.

(Continued)

*Primary Examiner* — Charles E Anya
(74) *Attorney, Agent, or Firm* — Barta Jones, PLLC

(57) ABSTRACT

Solutions for identifying and optimizing a process are provided herein. A recommender system creates a plurality of event pairs from an event log, and using historical data and features corresponding to the event pairs, the recommender system generates score values for each event pair. Using the score values and user preferences, the recommender system provides a recommended event pair to the user to include in a process.

20 Claims, 10 Drawing Sheets

(56) References Cited

U.S. PATENT DOCUMENTS

| | | | | |
|---|---|---|---|---|
| 2015/0161529 | A1* | 6/2015 | Kondaji | G06Q 10/063 |
| | | | | 705/7.11 |
| 2015/0254158 | A1* | 9/2015 | Puri | G06F 11/3476 |
| | | | | 714/37 |
| 2016/0371132 | A1* | 12/2016 | Prabhakara | G06F 11/0793 |
| 2017/0032248 | A1* | 2/2017 | Dotan-Cohen | G06Q 10/06 |
| 2018/0270261 | A1* | 9/2018 | Pande | G06N 7/01 |
| 2019/0066377 | A1 | 2/2019 | Schoening | |
| 2019/0279096 | A1 | 9/2019 | De Nijs et al. | |
| 2020/0349049 | A1* | 11/2020 | Krebs | G06N 20/00 |
| 2021/0166816 | A1 | 6/2021 | Khan et al. | |
| 2022/0121981 | A1* | 4/2022 | Chaudhuri | H04L 41/16 |

OTHER PUBLICATIONS

Li, et al., "Multi-Objective Optimization-Based Recommendation for Massive Online Learning Resources", In the IEEE Sensors Journal, vol. 21, Issue 22, Nov. 15, 2021, pp. 25274-25281.

Pufahl, et al., "Automatic Resource Allocation in Business Processes: A Systematic Literature Survey", In Repository of arXiv:2107.07264v1, Jul. 15, 2021, 28 Pages.

Zhao, et al., "The Optimization of Resource Allocation Based on Process Mining", In the Proceedings of International Conference on Intelligent Computing, Aug. 20, 2015, pp. 341-353.

International Preliminary Report Patentability received for PCT Application No. PCT/US23/036633, Jun. 5, 2025, 12 pages.

International Search Report and Written Opinion received for PCT Application No. PCT/US23/036633, Feb. 7, 2024, 18 pages.

* cited by examiner

| Case-ID | Event | Duration | Resource Cost | Error Rate | Resource | Location | Age |
|---|---|---|---|---|---|---|---|
| 1001 | Submit Documents | 100 | 80 | 0 | Sara | Germany | 21 |
| 1001 | Call for Help | 20 | 30 | 0 | Reza | Germany | 37 |
| 1002 | Submit Documents | 120 | 150 | .2 | Michal | France | 37 |
| 1001 | Withdraw the Request | 50 | 45 | 0 | Anja | Germany | 25 |
| 1002 | Apply for Credit Scoring | 500 | 225 | 1.2 | Sara | France | 21 |
| 1003 | Submit Documents | 110 | 140 | .3 | Reza | USA | 37 |
| 1002 | Add Additional Information | 200 | 300 | .1 | Sara | France | 21 |

FIG. 2

MULTI-FEATURE RESOURCE RECOMMENDER SYSTEM FOR PROCESS OPTIMIZATION AND USER PREFERENCE INFERENCE

BACKGROUND

Process mining supports the analysis of operational processes based on event logs. Process mining systems apply process mining techniques to the event logs to analyze the operational processes. Process mining techniques can be employed to identify and visualize patterns, trends, and other details of processes such that a process flow can be enhanced. Some techniques involve analyzing structured event logs that record a series of actions related to an operation process. The event logs can be generated by monitoring software that detects certain types of actions for recording. These actions, in some examples, include accessing, deleting, adding a file or an application on the worker device, for example, accessing and closing an invoice processing application. One of the goals of process mining is process optimization. Process optimization techniques involve finding inefficiencies in processes and addressing them.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Example solutions for process optimization include: identifying an event in an event log, the event comprising a resource and an activity; identifying resources from a plurality of resources that is associated with the activity in the event: creating a plurality of event pairs, the plurality of event pairs comprising the activity from the event and a different one of the resources that is associated with the activity; for the plurality of event pairs: converting the activity into an activity latent vector; converting the resource into a resource latent vector; and generating a score value by combining the resource latent vector and the activity latent vector; comparing score values from the plurality of event pairs; and based on the comparing, recommending an event pair from the plurality of event pairs for the event.

BRIEF DESCRIPTION OF THE DRAWINGS

The disclosed examples are described in detail below with reference to the accompanying drawing figures listed below:

FIG. 2. illustrates an event log available with various architectures, such as the example architecture of FIG. 1;

Corresponding reference characters indicate corresponding parts throughout the drawings.

DETAILED DESCRIPTION

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Process mining supports the analysis of operational processes based on event logs. Process mining systems apply process mining techniques to the event logs to analyze the operational processes. One of the goals of process mining is process optimization. However, process optimization techniques are difficult to perform on event logs as multiple factors impact a process performance and event logs capture completed states of intermittent actions. Further, while human operators can directly observe workers to determine various factors and other actions than those captured in event logs, this quickly becomes time-consuming and infeasible as organizations often have thousands or even millions of workers and devices processing tasks.

Solutions for identifying and optimizing processes are provided. An event monitor monitors and collects data from a storage database or an event log. The data within the storage database or the event log includes information about case instances that are stored or organized into fields. The event monitor is able to quickly and efficiently parse through the information and organize each process into a set of fields that can easily be displayed as an event log, which is used by a recommender system to provide a user with a recommendation to optimize a particular process.

Aspects of the disclosure optimize the operation of computing devices, for example, enabling a processor to execute less steps per process and enable the processor to execute steps more efficiently, thereby reducing electricity consumption (e.g., the processor uses less processing power to execute a given process) as well as using fewer resources to execute events and the overall process. This is accomplished, at least in part, by extracting knowledge from historical information stored in event logs and using this knowledge to train a recommender system and provide recommendations to use particular resources to execute an event based on inferred preferences of a user. In turn, this enables a recommendation to provide a resource that is best fit for a particular event based on a company's/user's particular set of preferences/goals/policies.

Figure 1:
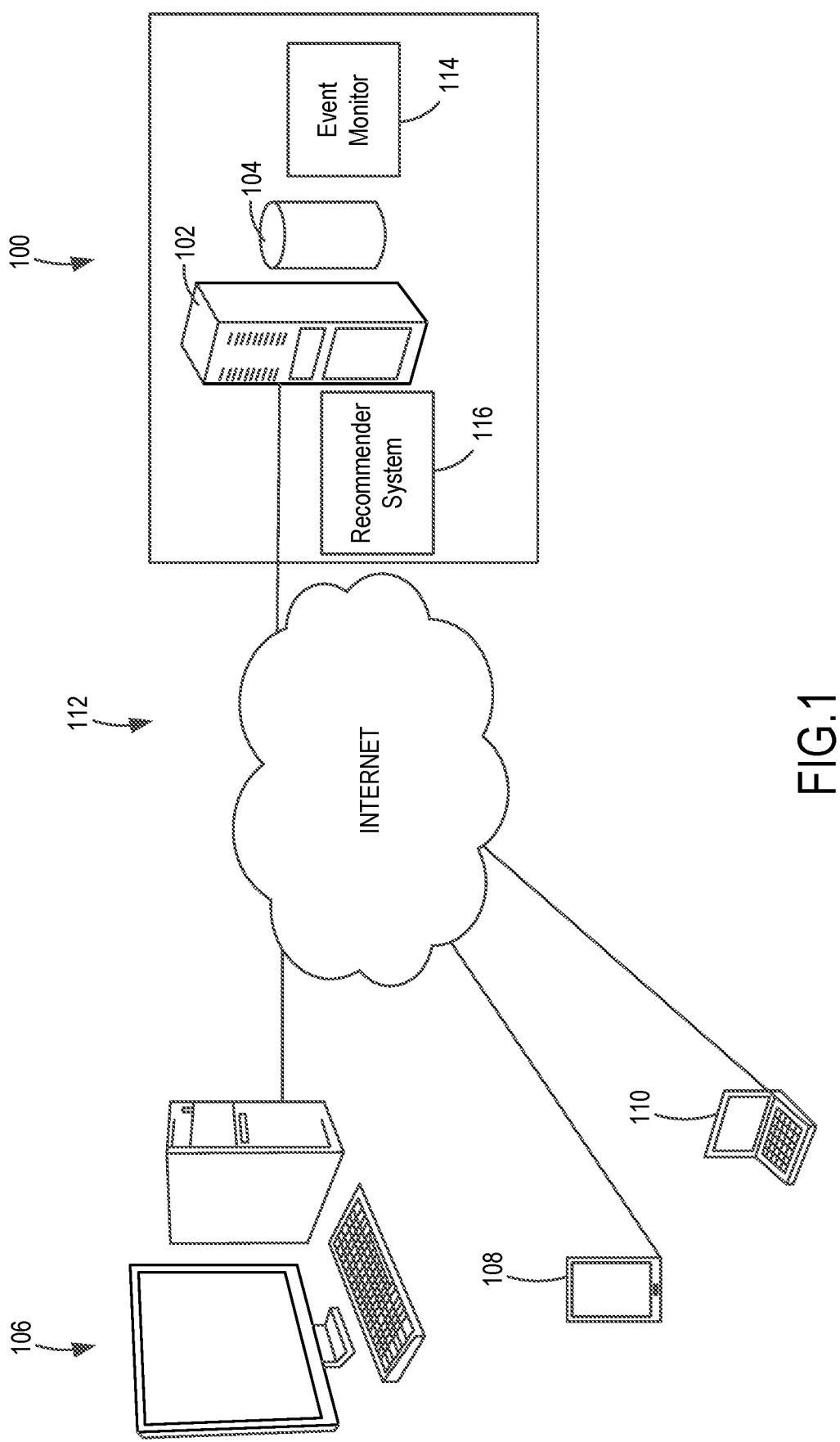
FIG. 1 illustrates an example architecture that advantageously provides for optimizing a process.

FIG. 1 is an exemplary architecture of a schematic block diagram of a system 100 deployed as a cloud service in this example. However, the system 100 can be deployed in non-cloud application, such as at local devices. The system 100 includes one or more computers 102 and storage 104 to store process information, for example, a case-ID, an event, timestamp, resource, resource cost, location, and age of a user in some examples. The system 100 is connected to a plurality of end user computing devices, such as a desktop computer 106, a smart phone 108 and a laptop computer 110. For example, the system 100 is shown as connected to end user computing devices via a computer network 112, illustrated as the Internet.

The system 100 is configured to operate using an event monitor 114 and a recommender system 116. It should be appreciated that some or all of the system 100 or the functionality of the system 100 can be implemented in the cloud as well as on the one or more computers 102, or on the end user computing devices (the desktop computer 106, the smart phone 108, and the laptop computer 110).

The event monitor 114 of the system 100 is configured to track GUI-based tasks as a user manually performs each task on a computing device, such as the desktop computer 106, the smart phone 108, and the laptop computer 110. The event monitor 114 monitors, pre-processes, and records user's GUI-based tasks as they are executed on the user's computing device. The event monitor 114 operates in the background of an OS on a computing device of the user. Because of this, the user is unaware that the event monitor 114 is monitoring and recording tasks performed by the user as the user goes about performing various tasks via inputs, such as those from a keyboard and a mouse. In some examples, tracked events include inputs from the keyboard, mouse, touchscreen, or other such inputs used for selections of options of GUI-based applications.

In addition, the event monitor 114 is also configured to monitor activities, which are a group of tasks that are input into the storage 104 manually by users or automatically input into the storage 104 through devices equipped with, for example, radio-frequency identification (RFID) and/or Quick Response code (QR) functionality. In some examples, an RFID/QR tag or asset tag is affixed to an object and contains information pertaining to that object. In these examples, RFID/QR identification employs equipment tags and/or process tags that support specific activities. The computing device, such as the smart phone 108 and the laptop computer 110 being a Bluetooth-enabled mobile devices, can deposit information onto, and retrieve information from, RFID/QR tags. Using RFID/QR tagging when a task pertaining to that object is performed enables that task to be automatically input into the storage 104. Further, by using RFID/QR tagging, the associated task is automatically associated with a particular user, a case-ID, and a timestamp, and this information is placed into the event log as shown in FIG. 2.

With reference now to FIG. 2, and event log 200 is provided. The event log 200 is an example of how input of a process performed by users (or a device) is organized and stored within the storage 104. The event log 200 includes a plurality of fields, such as a case-ID field 202, an event field 204, a duration field 206, a resource cost field 208, an error rate field 210, a resource field 212, a location field 214, and an age field 216. In some examples, the event log 200 includes additional fields or less fields than what is provided in the event log 200. In one example, the event log 200 only includes the case-ID field 202, the event field 204, the duration field 206, and the resource field 212. Further, while the event log 200 provides both a case-ID per event and a single case-ID for multiple events (e.g., a group of events in a particular process), in some examples, the event log 200 only includes one event and one resource per case-ID. In some examples, an event and a resource are described at a higher level, for example, not as a specific event or resource and instead, are represented as a group of events or resources, such as departments or companies.

In one example, the case-ID field 202 is used to group events that belong to a same process. Thus, all tasks performed during processing of a specific invoice (e.g., a particular event) would be assigned the same case-ID. In one example, an activity (described by the event field 204) is a single task, for example, a mouse click or a user signing in for work using an ID badge. In another example, an activity is a plurality of tasks performed in a sequence, for example, a user filling out a particular report. As shown in FIG. 2, the event field 204 identifies activities that include multiple tasks, such as, "submits documents", "call for help", "withdraw the request", "apply for credit scoring", and "add additional information". In some examples, the events are user defined, for example, by an administrator or employer. As such, each event is already defined prior to the event log 200 being created and prior to the activities defined by the event being executed by a resource.

The duration field 206 indicates a length of time it took a particular resource to execute the event. In other examples, the duration field 206 includes a time the event is initiated and a time the event is completed. The resource cost field 208 indicates an amount of money it cost the resource to execute the event. The error rate field 210 indicates the number of errors or a percentage of a total number of errors made by the resource during the execution of the event. The resource field 212 indicates a user, component, or device that executes the event identified in the event field 204. In some examples, a resource is a name of a user or a particular component/device used to perform the event, and an event describes an activity that was performed/executed by the resource. The location field 214 indicates the location the event is performed in, and the age field 216 indicates the age of the resource executing the event. In some examples, the event log 200 does not represented as a table as shown in FIG. 2, and instead, the event log 200 is a list of the information shown in FIG. 2 and stored in the storage 104 with tags that indicate the information that corresponds to a specific case-ID, timestamp, activity, and/or resource.

Each event, duration, resource cost, error rate, resource, location, and age provided within a corresponding event field 204, the duration field 206, the resource cost field 208, the error rate field 210, the resource field 212, the location field 214, and the age field 216, respectively, include one or more features stored in the storage 104. For example, the event "submit documents" includes data stored in the storage 104 particular to the document being submitted, and this data is identified/stored as features. Examples of features for the document being submitted are, a length of the document, the language the contents of the document, a type of document, a subject or topic represented by the document, a level of authorization needed to access the document, a storage size of the document, and the like. Exemplary features for a user as a resource are education level of the user, experience level of the user, an age of the user, a gender of the user, ethnicity of the user, languages the user is fluent in, availability of the user, and the like. Exemplary features of a device/component as a resource are specifications of the device/component, a bandwidth of the device/component, a version ID of the device/component, a compatibility of the device/component, a level of usage (historic and current) for the device/component, and the like.

In addition to features, the storage 104 also includes historical data for each event, duration, resource cost, error rate, resource, location, and age provided within the corresponding event field 204, the duration field 206, the resource cost field 208, the error rate field 210, the resource field 212, the location field 214, and the age field 216, respectively. In one example, the historical data includes data corresponding to actual execution of each event in the event log 200.

With reference back to FIG. 1, the recommender system 116 accesses the event log 200 from the storage 104 to create a plurality of event pairs from the event log 200 for a particular event. Each of the plurality of event pairs include an event/activity for a corresponding event along with a resource that is associated with the event/activity. For each event pair from the plurality of event pairs, the recommender system 116 access features and historical data for the event/activity and the resource to generate score values for each event pair. In one example, the recommender system 116 utilizes the accessed features and historical data for the event/activity to convert (or generate) the event/activity into an activity latent vector that represents the event/activity. In one example, the activity latent vector is a vector of a plurality of numbers, such as 10 numbers. The recommender system 116 utilizes the accessed features and historical data for the resource to convert (or generate) the resource into a resource latent vector that represents the resource. In one example, the resource latent vector is a vector of a plurality of numbers, such as 10 numbers. The recommender system 116 combines (e.g., multiplies) the resource latent vector with the activity latent vector to generate a score value for the corresponding event pair based on implicit features the recommender system has generated for the particular resource and event. In one example, the score value generated by the recommender system 116 represents the cost of the resource executing the event or the duration of time taken for the resource to execute the event.

Figure 3:
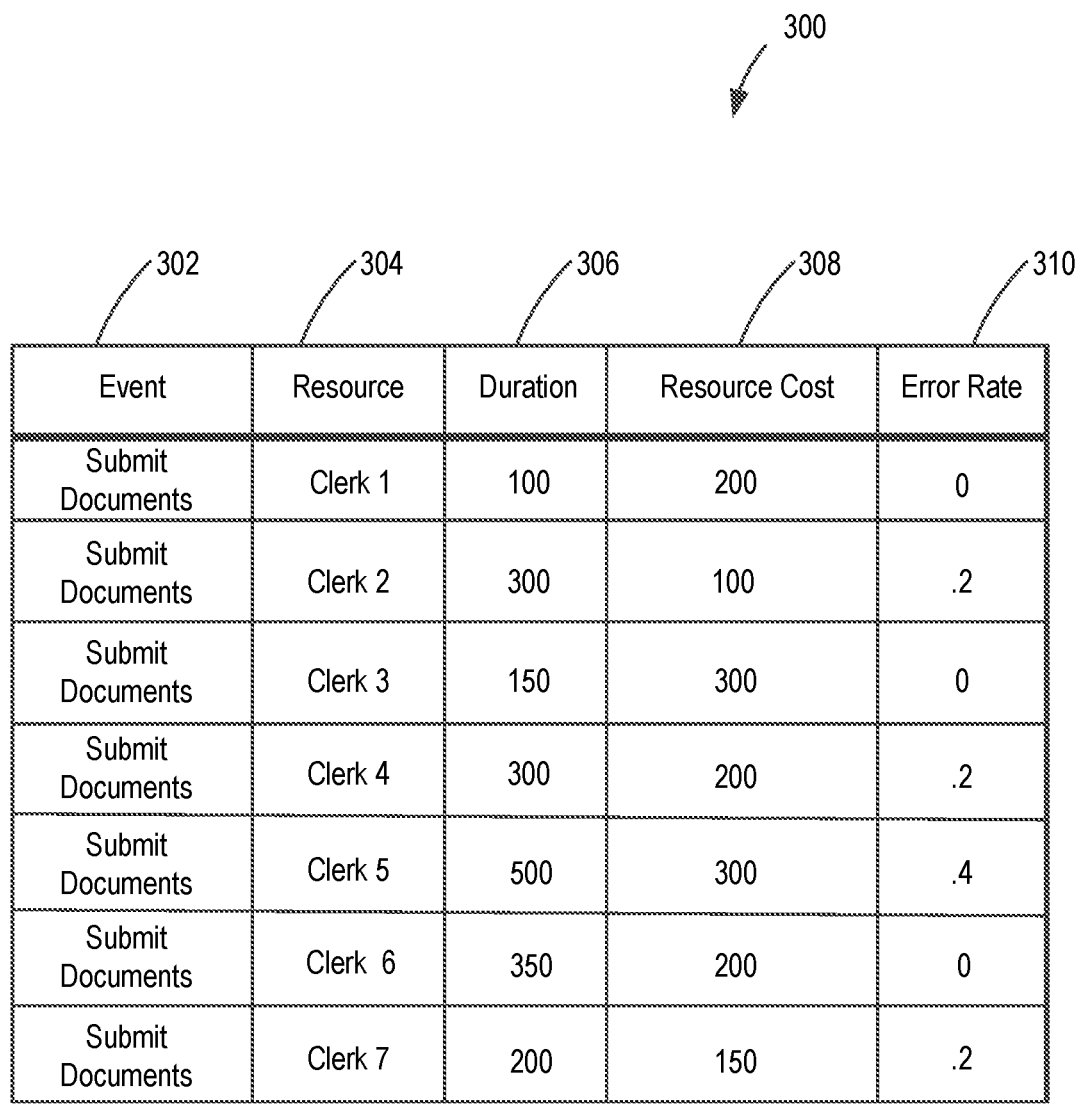
FIG. 3 illustrates a score value log available with various architectures, such as the example architecture of FIG. 1.

For example, with reference now to FIG. 3, a score value log 300 is provided. The score value log 300 includes a list of event pairs (e.g., an event and a resource) with their corresponding score values. More specifically, the score value log 300 includes an event pair field 302, a resource pair field 304, a duration score value field 306, a resource cost score value field 308, and an error rate score value field 310. In the example shown in FIG. 3, the recommender system 116 paired a particular event with a plurality of different resources executing the event. Based on the particular event and the corresponding resource, the recommender system 116 generates (or predicts) a score value for a duration, a cost, and error rate for each event pair (e.g., each resource executing the particular event). In the example shown in FIG. 3, Clerk 1 is an employee (i.e., resource) that is shown to take 100 minutes to execute the event "submit documents" at a cost of "200" dollars, with an error rate of "0". In contrast, Clerk 2 is shown to take 300 minutes to execute the event "submit documents" at a cost of "100" dollars with an error rate of "0.2".

In one example, each resource includes historic data with respect to a particular resource executing the particular event/activity. In another example, there is no historic data with respect to the particular resource executing the particular event/activity. As such, the recommender system 116 utilizes other data for the particular resource to predict score values. For example, the recommender system 116 accesses other events/activities the particular resource has executed from the storage 104 and utilizes this other historical data to predict score values for the particular resource executing the particular event/activity. In some examples, the recommender system 116 is trained using historical data for a particular resource and event/activity or a combination of historical data for the particular resource and event/activity with historical data of the particular resource executing other events/activities. In other examples, while the recommender system 116 can advantageously generate (or predict) scores for multiple fields other than duration and cost, such as error rate, each score value is generated (or predicted) based on what a user/company wants to optimize. As such, in one example, the user/company provides the fields the user/company wants to consider in optimizing a particular event/activity and the recommender system 116 generates (or predicts) the corresponding score values for the event pairs. As described below with respect to FIG. 4, the recommender system 116 utilizes the generated score values for each of the plurality of event pairs to rank or filter the event pairs for the user/company.

Figure 4:
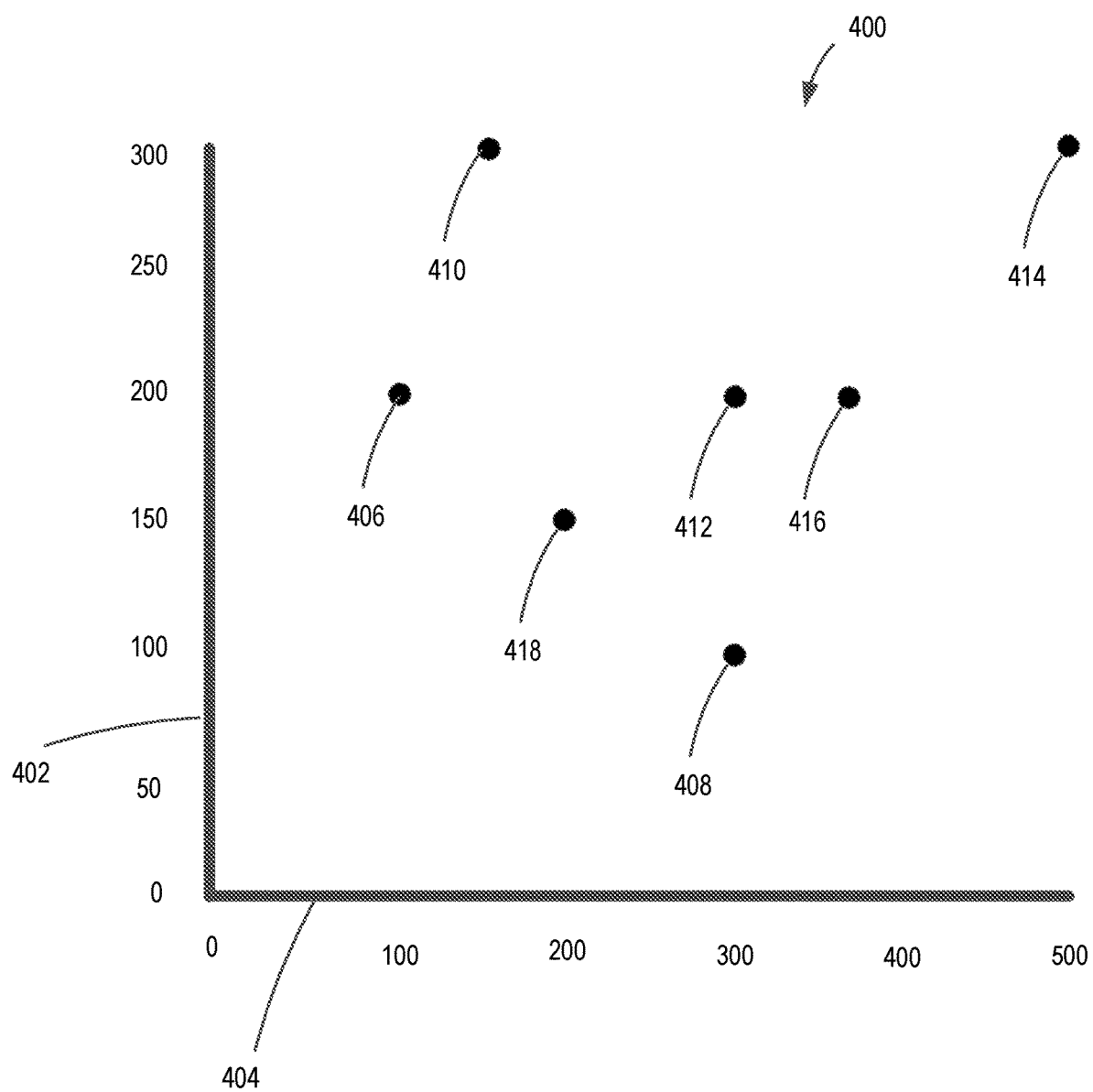
FIG. 4 illustrates a plot diagram of score values generated by the recommender system in various architectures, such as the example architecture of FIG. 1.

With reference now to FIG. 4, a plot diagram 400 illustrating the application of multiple score values generated by the recommender system 116 for a particular event is provided. In the example shown in FIG. 4, duration and cost for the event and corresponding resources are optimized/considered simultaneously. In this example, the y-axis 402 in FIG. 4 represents costs and the x-axis 404 represents duration. The recommender system 116 plots each resource, for example, each of the Clerks 1-7 on the plot diagram 400 (e.g., as a dot) with respect to their corresponding score values for duration and cost for executing the particular event. For example, as shown in FIG. 4, Clerk 1 is represented by dot 406 with a duration of 100 minutes and a cost of 200 dollars for executing the particular event, Clerk 2 is represented by dot 408 with a duration of 300 minutes and a cost of 100 dollars for executing the particular event, Clerk 3 is represented by dot 410 with a duration of 150 minutes and a cost of 300 dollars for executing the particular event, Clerk 4 is represented by dot 412 with a duration of 300 minutes and a cost of 200 for executing the particular event, Clerk 5 is represented by dot 414 with a duration of 500 minutes and a cost of 300 dollars for executing the particular event, Clerk 6 is represented by dot 416 with a duration of 350 minutes and a cost of 200 dollars for executing the particular event, and Clerk 7 is represented by dot 418 with a duration of 200 minutes and a cost of 150 dollars for executing the particular event.

In one example, the recommender system 116 determines the pareto-optimal front of non-dominated event pairs with respect to the designated objects of duration and cost. For example, as shown in FIG. 4, the Clerk 1, represented by dot 406 has the fastest duration, but is not the cheapest resource. Thus, every Clerk that has a duration that exceeds the duration for the Clerk 1 and that also includes a cost that exceeds the cost of the Clerk 1 is removed from consideration. As such, in the example shown in FIG. 4, the Clerk 3 (represented by the dot 410) and the Clerk 5 (represented by the dot 414) are removed. Moving on to the Clerk 7 (represented by the dot 418), the Clerk 7 is slower than the Clerk 1, but the Clerk 7 costs less than the Clerk 1. As such, the Clerk 7 remains. Moving now to the Clerk 4 (represented by the dot 412), the Clerk 4 costs the same as the Clerk 1, but the Clerk 4 is slower and cost more than Clerk 7. As such, the Clerk 4 (represented by the dot 412) is removed. Moving on to the Clerk 2 (represented by the dot 408), the Clerk 2 is slower than each of the Clerk 1 and the Clerk 7; however, the Clerk 2 costs less than each of the Clerk 1 and the Clerk 7. As such, the Clerk 7 (represented by the dot 408) remains. Moving on to the Clerk 6 (represented by the dot 416), the Clerk 6 cost the same as the Clerk 1; however, the Clerk 6 cost more and is slower than the Clerk 1, the Clerk 2, and the Clerk 7. As such, the Clerk 6 (represented by the dot 416) is removed.

Figure 5:
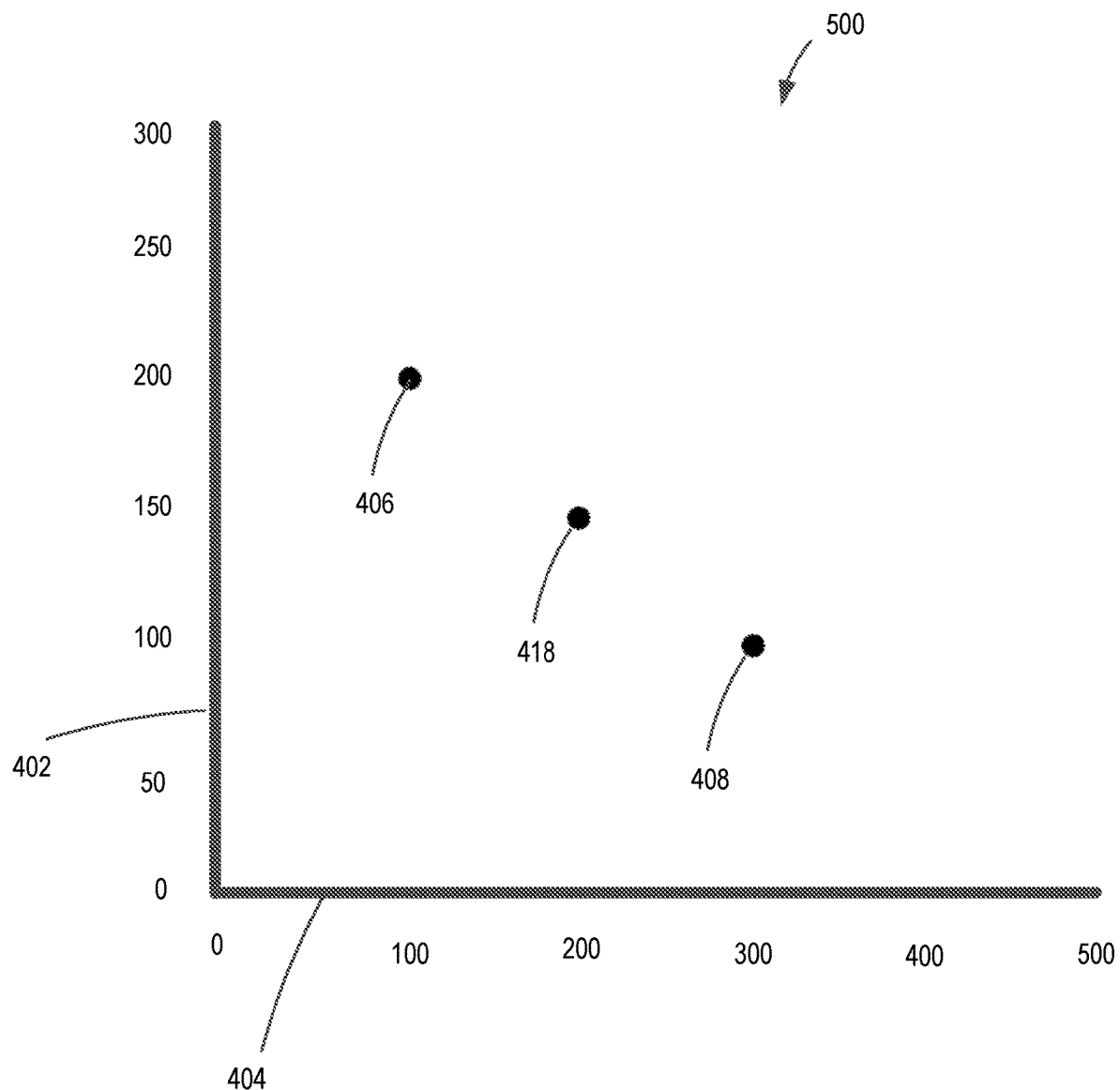
FIG. 5 illustrates a plot diagram of score values generated by the recommender system in various architectures, such as the example architecture of FIG. 1.

FIG. 5 illustrates a plot diagram 500 after the recommender system 116 has determined the pareto-optimal front of non-dominated event pairs with respect to the designated objects of duration and cost, and removed the dots 410-416. As shown in FIG. 5, the Clerks 1, 2, and 7 (corresponding to the dots 406, 408, and 418, respectively), are all that remain after the filtering. As such, the recommender system 116 has narrowed the event pairs to three event pairs represented by the dots 406, 408, and 418.

Figure 6:
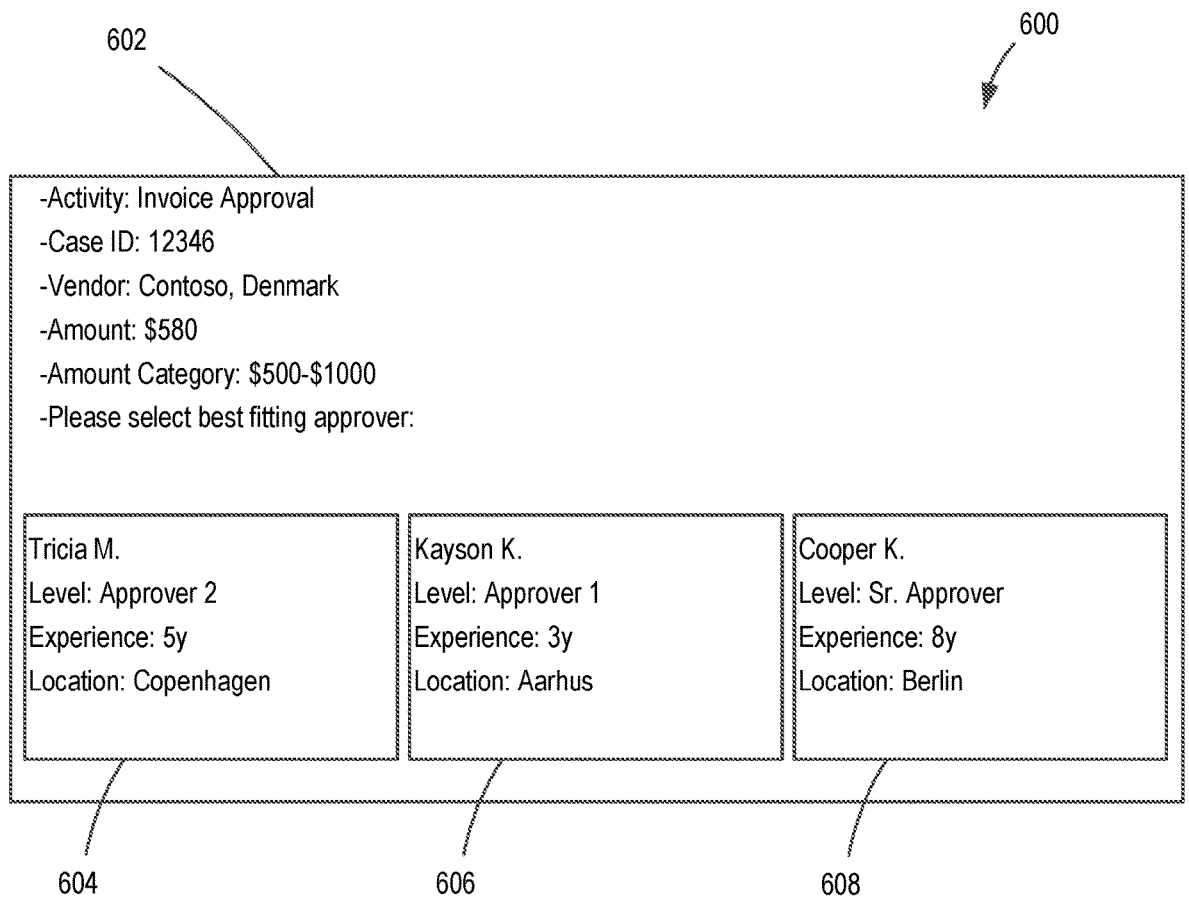
FIG. 6 shows a user interface illustrating resource recommendations generated by the recommender system in various architectures, such as the example architecture of FIG. 1.

With reference now to FIG. 6, the recommender system 116 provides exemplary user interface 600 for a user that includes a description of the event, "Submit Documents", along with the features of the event, a list of each resource provided in FIG. 5, and corresponding features for each of the resources. For example, as shown in FIG. 6, an exemplary user interface 600 that includes a description of the event 602, and a description of each potential resource 604, 606, and 608 (corresponding to the Clerk 7, the Clerk 2, and the Clerk 1 from FIG. 5, respectively) is provided to the user to view. As explained above with respect to FIGS. 4 and 5, the potential resources 604, 606, and 608 (corresponding to the Clerk 7, the Clerk 2, and the Clerk 1, respectively) are what remain after the recommender system 116 has filtered out the other resources. As such, each of the potential resources 604, 606, and 608 are recommendations for the user to select. As shown in FIG. 6, each of the potential resources 604, 606, and 608 have different levels of authority/positions, different levels of experience, and are located in different countries. As such, the user views the features of the event 602 and compares the features of the event 602 with the features associated with each of the potential resources 604, 606, and 608. Based on the comparing and one or more preferences of the user, the user selects one of the potential resources 604, 606, and 608. In one example, the user prefers that the event 602 is completed with the least amount of cost. As such, the user selects the Clerk 2 (represented by the potential resource 606) as this employee is shown to have the least amount of experience and is therefore less expensive than using one of the other potential resources 604 or 608. In another example, the user prefers that the event 602 is completed in the least amount of time. As such, the user selects the Clerk 1 (represented by the potential resource 608) as this employee has the most experience and can execute the event the quickest (although not the cheapest).

In any one of the examples described above, the recommender system 116 infers the preference of the user based on the selection. That is, the user does not need to indicate why the user selected one of the particular potential resources 604, 606, and 608. In one example, when the user selects the potential resource 606 (corresponding to the Clerk 2), the recommender system 116 infers that cost is more important to the user than experience with respect to the particular event "submit documents" given the Clerk 2 is the least experienced of the potential resources and therefore the cheapest. In another example, when the user selects the potential resource 608, (corresponding to the Clerk 1), the recommender system 116 infers by the recommender system 116 from the selection of the Clerk 1 that duration of time is more important than cost to execute the event "submit documents" given that the Clerk 1 is the most experienced of the potential resources and therefore the most expensive to use.

By inferring the preferences of the user, the recommender system 116 is not only able to select a best resource to optimize executing the particular event based on multiple features, such as cost, duration, and error rate, but the recommender system 116 is also able select the resource that takes into consideration user preferences inferred by the recommender system 116. As such, the recommender system 116 is able to provide the most optimal resource that best fits the user preferences (explicit preferences and inferred preferences) for executing a particular event. For example, the recommender system 116 stores the inferred preferences of the user in the storage 104 for later use. That is, after the recommender system 116 has obtained at least one selection of the potential resources of the user, the recommender system 116 is able to recommend a particular resource for a particular event based on the stored preferences of the user and the stored inferred preferences of the user. Further, as the recommender system 116 obtains more selections of potential resources from the user for different events, the recommender system 116 increases in accuracy for the recommendations for the particular user.

Figure 7:
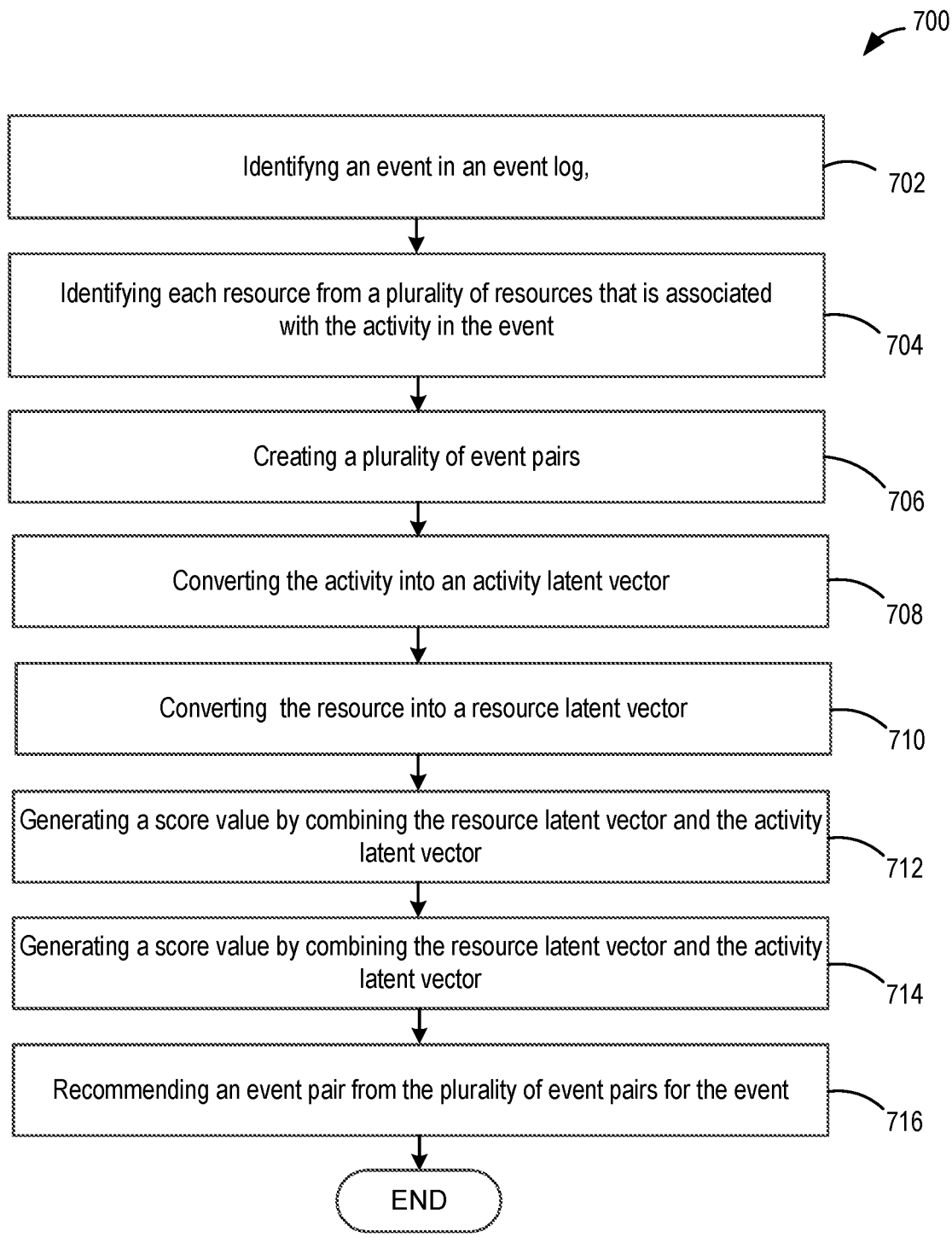
FIG. 7 shows a flowchart illustrating exemplary operations that are performed using examples of various architectures, such as the example architecture of FIG. 1.

With reference now to FIG. 7, FIG. 7 shows a flowchart 700 illustrating exemplary operations for training a recommender system 116 that are performed by the recommender system 116. In some examples, operations described for flowchart 700 are performed by computing device 900 of FIG. 9. The flowchart 700 commences at 702 when an event in the event log 200 is identified. In some examples, the event log 200 is accessed to identify each event. In other examples, the event log 200 is not in a form of a table as shown in FIG. 2, and instead, the information within the event log 200 is stored in the storage 104, with the information of each of the fields 204-216 being associated with, for example, tagged, with a corresponding case-ID.

At 704, each resource from a plurality of resources that is associated with the activity in the event are identified. In addition, data for the plurality of resources stored in a memory, for example, the storage 104, is accessed. In one example, the data for each of the plurality of resources comprises features and historic data for each of the plurality of resources and corresponding interactions with events/activities. At 706, a plurality of event pairs are created. In one example, each event pair includes the activity from a corresponding event and a different one of the resources that is associated with the event/activity.

At 708, the event/activity for each of the plurality of event pairs is converted into an activity latent vector, wherein the activity latent vector is based at least on features (accessed from the storage 104) corresponding to the activity. In one example, the accessed features and historical data for the event/activity are used to convert (or generate) the event/activity into the activity latent vector that represents the event/activity. In one example, the activity latent vector is a vector of a plurality of numbers, such as 10 numbers. At 710, each resource for each of the plurality of event pairs is converted into a resource latent vector, wherein the resource latent vector is based at least on features (accessed from the storage 104) corresponding to the resource. In one example, the accessed features and historical data for the resource are used to convert (or generate) the resource into the resource latent vector that represents the resource. In another example, the resource latent vector is a vector of a plurality of numbers, such as 10 numbers.

At 712, a score value for each of the plurality of event pairs is generated by combing the resource latent vector with the activity latent vector in each of the event pairs. In one example, the score value represents the cost of the resource executing the event or the duration of time taken for the resource to execute the event. At 714, the score values for each of the plurality of event pairs is compared to one another. At 716, based on the comparing, two or more event pairs from the plurality of event pairs is recommended to a user for optimizing executing the event corresponding to the plurality of event pairs. For example, as described above with respect to FIG. 6, the user interface 600 is presented to the user to enable the user to view potential resources from the event pairs being recommended. At 718, a selection of one of the event pairs is received from the user. At 720, based on the selected event pair, the selected event pair is assigned to a corresponding process for execution. At 722, based on the selection of the event pair, preferences of the user stored in the storage 104 are updated. For example, preferences for the user making the selection are inferred from the selection of the event pair based at least on the features in the selected event pair that are not included in one or more of the other of the two or more event pairs recommended to the user. In one example, the inferred preferences are then used to update the user preferences stored in the storage 104. In some examples, the process shown in FIG. 7 is repeated for new/different event pairs corresponding to different events and/or different users to further train the recommender system 116. In one example, after the recommender system 116 has completed the process illustrated in FIG. 7 for the particular event, the recommender system 116 proceeds to the flowchart 800 illustrated in FIG. 8 for recommending a single event pair from a plurality of event pairs for optimizing the corresponding event/process using the learned inferred preferences from the flowchart 700.

Figure 8A:
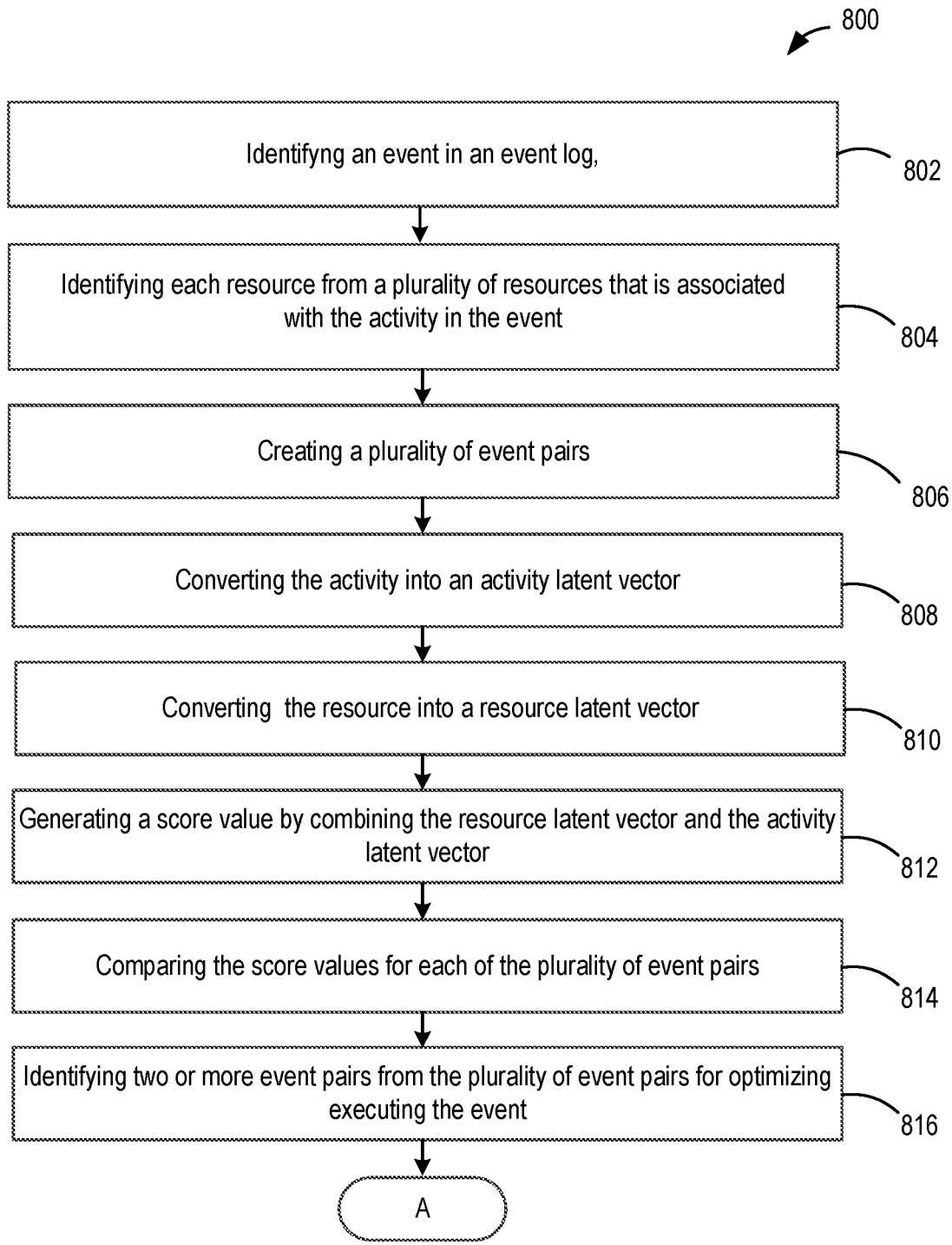
FIG. 8 shows a flowchart illustrating exemplary operations that are performed using examples of various architectures, such as the example architecture of FIG. 1.
Figure 8B:
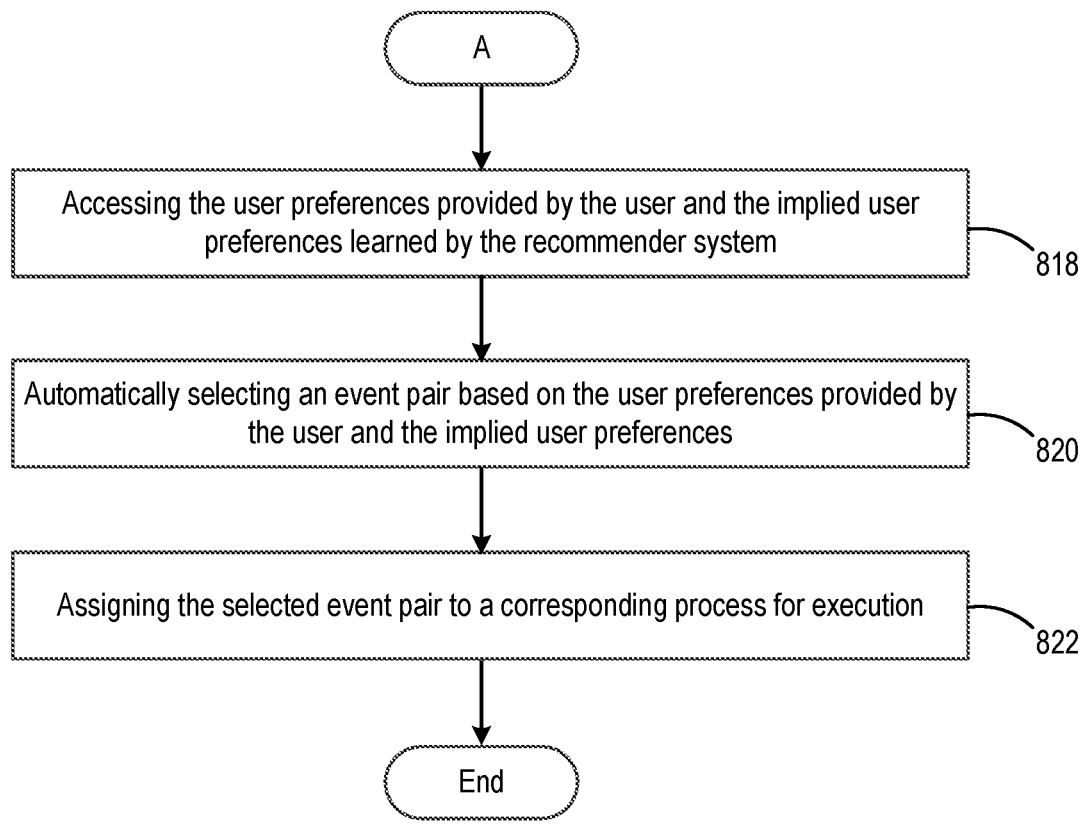

For example, with reference now to FIG. 8, the flowchart 800 is provided for recommending a single event pair to a user based at least on implied user preferences, historical data, and user preferences explicitly provided by a user. In some examples, operations described for the flowchart 800 are performed by the computing device 900 of FIG. 9. The flowchart 800 commences at 802 when an event in the event log 200 is identified. In some examples, the event log 200 is accessed to identify each event. In other examples, the event log 200 is not in a form of a table as shown in FIG. 2, and instead, the information within the event log 200 is stored in the storage 104, with the information of each of the fields 204-216 being associated with, for example, tagged, with a corresponding case-ID.

At 804, each resource from the plurality of resources that is associated with the activity in the event are identified. In addition, data for the plurality of resources stored in a memory, for example, the storage 104, is accessed. In one example, the data for each of the plurality of resources comprises features and historic data for each of the plurality of resources and corresponding interactions with events/activities. At 806, a plurality of event pairs are created. In one example, each event pair in the plurality event pairs includes the activity from a corresponding event and a different one of the resources that is associated with the event/activity.

At 808, the event/activity for each of the plurality of event pairs is converted into an activity latent vector, wherein the activity latent vector is based at least on features (accessed from the storage 104) corresponding to the activity. In one example, the accessed features and historical data for the event/activity are used to convert (or generate) the event/activity into the activity latent vector that represents the event/activity. In one example, the activity latent vector is a vector of a plurality of numbers, such as 10 numbers. At 810, each resource for each of the plurality of event pairs is converted into a resource latent vector, wherein the resource latent vector is based at least on features (accessed from the storage 104) corresponding to the resource. In one example, the accessed features and historical data for the resource are used to convert (or generate) the resource into the resource latent vector that represents the resource. In another example, the resource latent vector is a vector of a plurality of numbers, such as 10 numbers.

At 812, a score value for each of the plurality of event pairs is generated by combining the resource latent vector with the activity latent vector. In one example, the score value represents the cost of the resource executing the event or the duration of time taken for the resource to execute the event. At 814, the score values for each of the plurality of event pairs is compared. At 816, based on the comparing, two or more event pairs from the plurality of event pairs are identified for optimizing executing the event corresponding to the plurality of event pairs. At 818, the user preferences identified/provided by the user and the implied user preferences learned by the recommender system 116 during training are accessed from the storage 104. At 820, the user preferences provided by the user and the implied user preferences are used to automatically select one of the event pairs, for example, without user intervention. Thus, unlike the flowchart 700, a user does not select a particular resource/event pair at 820. Rather, one of the event pairs is automatically selected, for example, by the recommender system 116 based on historical data, user preferences provided by the user, and user preferences inferred from previous user selections. At 822, based on the selected event pair, the selected event pair is assigned to a corresponding process for execution.

Additional Examples

An example system for providing process optimization, the system comprising: a memory comprising data for a plurality of resources: a processor: and a recommender system. The recommender system comprises: a computer-readable medium storing instructions that cause the processor to perform the following operations: identify an event in an event log, the event comprising a resource and an activity; identify, from the memory, resources from the plurality of resources that are associated with the activity in the event: create a plurality of event pairs, the plurality of event pairs comprising the activity from the event and a different one of the resources that is associated with the activity; for the plurality of event pairs: convert the activity into an activity latent vector; convert the resource into a resource latent vector; and generate a score value by combining the resource latent vector and the activity latent vector; compare score values from the plurality of event pairs; and based on the comparing, recommend an event pair from the plurality of event pairs for the event.

An exemplary method for providing process optimization comprises: identifying an event in an event log, the event comprising a resource and an activity; identifying resources from a plurality of resources that are associated with the activity in the event: creating a plurality of event pairs, the plurality of event pairs comprising the activity from the event and a different one of the resources that is associated with the activity; for the plurality of event pairs: converting the activity into an activity latent vector; converting the resource into a resource latent vector; and generating a score value by combining the resource latent vector and the activity latent vector; comparing score values from the plurality of event pairs; and based on the comparing, recommending an event pair from the plurality of event pairs for the event.

A computer storage device having computer-executable instructions stored thereon, which, on execution by a computer, cause the computer to perform operations comprising:

identifying an event in an event log, the event comprising a resource and an activity; identifying resources from a plurality of resources that are associated with the activity in the event: creating a plurality of event pairs, event pairs comprising the activity from the event and a different one of the resources that is associated with the activity; for the plurality of event pairs: converting the activity into an activity latent vector; converting the resource into a resource latent vector; and generating a score value by combining the resource latent vector and the activity latent vector; comparing score values from the plurality of event pairs; and based on the comparing, recommending an event pair from the plurality of event pairs for the event.

Alternatively, or in addition to the other examples described herein, examples include any combination of the following:

- wherein the data for the plurality of resources comprises features for the plurality of resources and historic data for the plurality of resources and corresponding interactions with activities;
- wherein the resource latent vector is based at least on features corresponding to the resource;
- wherein the memory further comprises features for the activity and wherein the activity latent vector is based at least on features corresponding to the activity;
- accessing previous event pair selections of a user;
- based on the previous event pair selections, determining preferences of the user;
- based at least on the determined preferences, recommending the event pair from the plurality of event pairs for the event;
- wherein the memory further comprises the preferences of the user, the preferences of the user comprising preferences received from the user and preferences learned by the recommender system during a training period;
- based on the comparing, recommend the event pair and a second event pair from the plurality of event pairs for the event;
- receiving, from a user, a selection of the event pair;
- based on the select of the event pair, assigning the event pair to the corresponding process; and
- based at least on the selection of the event pair, update preferences of the user based at least on the selection of the event pair and not the selection of the second event pair.

While the aspects of the disclosure have been described in terms of various examples with their associated operations, a combination of operations from any number of different examples is also within scope of the aspects of the disclosure.

Example Operating Environment

Figure 9:
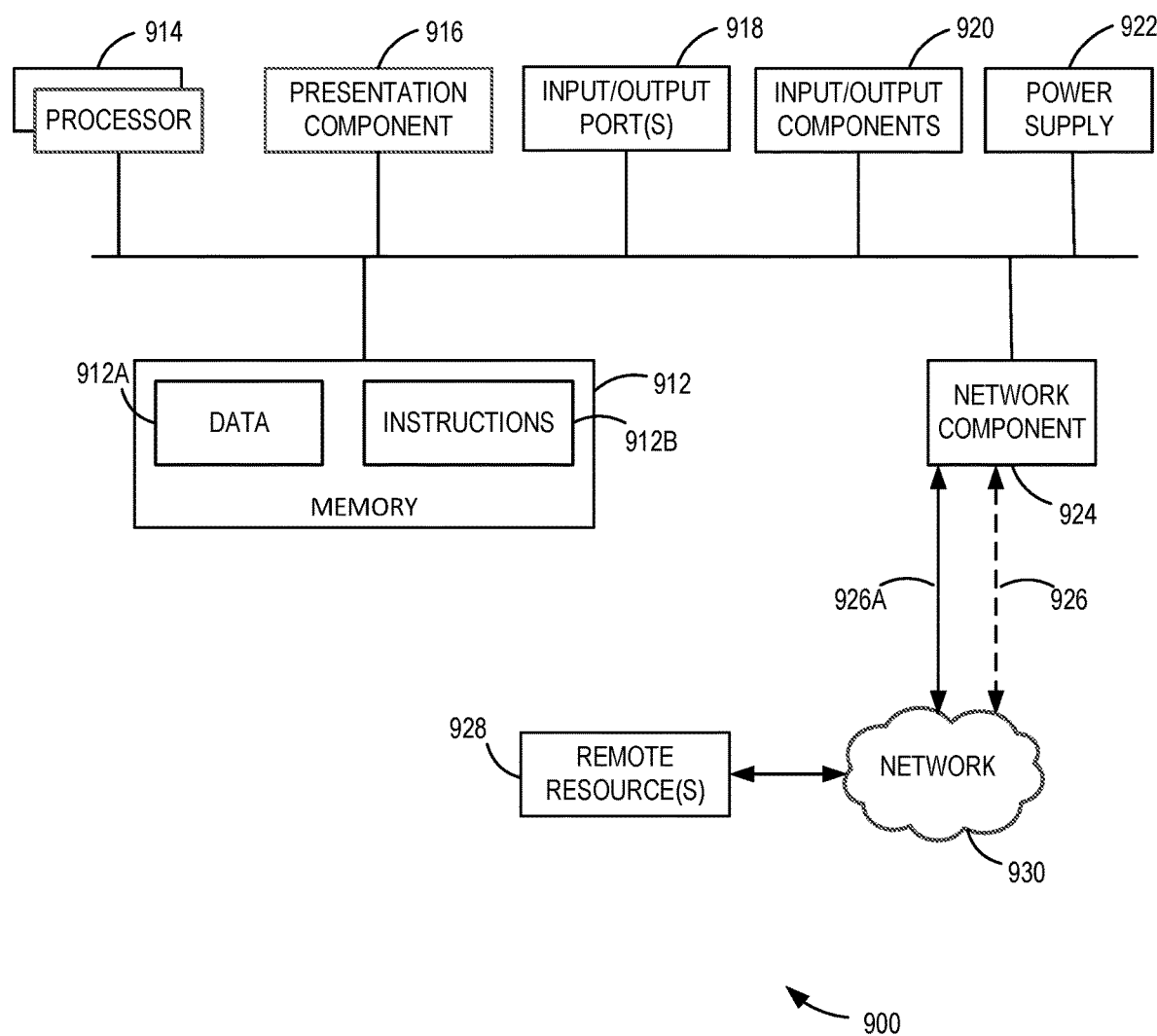
FIG. 9 shows a block diagram of an example computing device suitable for implementing some of the various examples disclosed herein.

FIG. 9 is a block diagram of the computing device 900 (e.g., a computer storage device) for implementing aspects disclosed herein, and is designated generally as the computing device 900. In some examples, the computing device 900 is provided for an on-premises computing solution. In some examples, one or more of the computing devices 900 are provided as a cloud computing solution. In some examples, a combination of on-premises and cloud computing solutions are used. The computing device 900 is but one example of a suitable computing environment and is not intended to suggest any limitation as to the scope of use or functionality of the examples disclosed herein, whether used singly or as part of a larger set.

Neither should the computing device 900 be interpreted as having any dependency or requirement relating to any one or combination of components/modules illustrated. Some of the examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. Some of the disclosed examples are practiced in distributed computing environments when tasks are performed by remote-processing devices that are linked through a communications network.

The computing device 900 includes a bus 910 that directly or indirectly couples the following devices: computer storage memory 912, one or more processors 914, one or more presentation component(s) 916, input/output (I/O) ports 919, I/O components 920, a power supply 922, and a network component 924. While the computing device 900 is depicted as a seemingly single device, in some examples, multiple ones of the computing device 900 work together and share the depicted device resources. In one example, the memory 912 is a distributed across multiple devices, and the one or more processor(s) 914 is/are housed with different devices.

Bus 910 represents one or more busses (such as an address bus, data bus, or a combination thereof). Although the various blocks of FIG. 9 are shown with lines for the sake of clarity, delineating various components is accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." In some examples, the memory 912 takes the form of the computer storage media referenced below and operatively provide storage of computer-readable instructions, data structures, program modules and other data for the computing device 900. In some examples, the memory 912 stores one or more of an operating system, a universal application platform, or other program modules and program data. The memory 912 is thus able to store and access data 912a and instructions 912b that are executable by the one or more processor(s) 914 and configured to carry out the various operations disclosed herein.

In some examples, the memory 912 includes computer storage media. The memory 912 includes any quantity of memory associated with or accessible by the computing device 900. In some examples, the memory 912 is internal to the computing device 900 (as shown in FIG. 9), external to the computing device 900 (not shown), or both (not shown). Additionally, or alternatively, the memory 912 is distributed across multiple ones of the computing device 900, for example, in a virtualized environment in which instruction processing is carried out on multiple ones of the computing device 900. For the purposes of this disclosure, "computer storage media," "computer-storage memory," "memory," and "memory devices" are synonymous terms for a computer-storage, for example, the memory 912, and none of these terms include carrier waves or propagating signaling.

In some examples, the one or more processor(s) 914 includes any quantity of processing units that read data from various entities, such as the memory 912 or the I/O components 920. Specifically, the one or more processor(s) 914 are programmed to execute computer-executable instructions for implementing aspects of the disclosure. In some examples, the instructions are performed by the processor, by multiple processors within the computing device 900, or by a processor external to the computing device 900. In some examples, the one or more processor(s) 914 are programmed to execute instructions such as those illustrated in the flow charts discussed below and depicted in the accompanying drawings. Moreover, in some examples, the one or more processor(s) 914 represent an implementation of analog techniques to perform the operations described herein. For example, the operations are performed by an analog client computing device, for example, the computing device 900 and/or a digital client computing device, for example the computing device 900. The one or more presentation component(s) 916 present data indications to a user or other device. Exemplary presentation components include a display device, speaker, printing component, vibrating component, etc. In some examples, the computer data is presented in a number of ways, such as visually in a graphical user interface (GUI), audibly through speakers, wirelessly between two or more of the computing device 900, across a wired connection, or in other ways. I/O ports 918 allow the computing device 900 to be logically coupled to other devices including the I/O components 920, some of which is built in in some examples. Examples of the I/O components 920 include, for example but without limitation, a microphone, joystick, game pad, satellite dish, scanner, printer, wireless device, etc.

In some examples, the computing device 900 operates in a networked environment via the network component 924 using logical connections to one or more remote computers. In some examples, the network component 924 includes a network interface card and/or computer-executable instructions (e.g., a driver) for operating the network interface card. In some examples, communication between the computing device 900 and other devices occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), BLUETOOTH branded communications, or the like), or a combination thereof. Network component 924 communicates over wireless communication link 926 and/or a wired communication link 926a to a remote resource 928 (e.g., a cloud resource) across network 930. Various different examples of communication links 926 and 926a include a wireless connection, a wired connection, and/or a dedicated link, and in some examples, at least a portion is routed through the internet.

Although described in connection with an example of the computing device 900, examples of the disclosure are capable of implementation with numerous other general-purpose or special-purpose computing system environments, configurations, or devices. Examples of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices accept input from the user in any way, including from input devices such as a keyboard or pointing device, via gesture input, proximity input (such as by hovering), and/or via voice input.

Examples of the disclosure are described in the general context of computer-executable instructions, such as program modules, executed by one or more computers or other devices in software, firmware, hardware, or a combination thereof. In some examples, the computer-executable instructions are organized into one or more computer-executable components or modules. Generally, program modules include, but are not limited to, routines, programs, objects, components, and data structures that perform particular tasks or implement particular abstract data types. Aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and are performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there are, in some examples, additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for providing process optimization, the system comprising:
a memory comprising data for a plurality of resources;
a processor; and
a recommender system comprising:
a computer-readable medium storing instructions that cause the processor to perform the following operations:
identify an event in an event log, the event comprising a resource and an activity;
identify, from the memory, resources from the plurality of resources that are associated with the activity in the event;
create a plurality of event pairs, the plurality of event pairs comprising the activity from the event and a different one of the resources that is associated with the activity;
for the plurality of event pairs:
convert the activity into an activity latent vector;
convert the resource into a resource latent vector; and
generate a score value by combining the resource latent vector and the activity latent vector;
compare score values from the plurality of event pairs; and
based on the comparing, recommend an event pair from the plurality of event pairs for the event.

2. The system of claim 1, wherein the data for the plurality of resources comprises features for the plurality of resources and historic data for the plurality of resources and corresponding interactions with activities.

3. The system of claim 1, wherein the resource latent vector is based at least on features corresponding to the resource.

4. The system of claim 3, wherein the memory further comprises features for the activity and wherein the activity latent vector is based at least on features corresponding to the activity.

5. The system of claim 1, wherein the computer-readable medium further stores instructions that cause the processor to perform the following operations:
access previous event pair selections of a user;
based on the previous event pair selections, determine preferences of the user; and
based at least on the determined preferences, recommend the event pair from the plurality of event pairs for the event.

6. The system of claim 5, wherein the memory further comprises the preferences of the user, the preferences of the user comprising preferences received from the user and preferences learned by the recommender system during a training period.

7. The system of claim 1, wherein the computer-readable medium further stores instructions that cause the processor to perform the following operations:
based on the comparing, recommend the event pair and a second event pair from the plurality of event pairs for the event;
receive, from a user, a selection of the event pair;
based on the selecting of the event pair, assign the event pair to a corresponding process; and
based at least on the selection of the event pair, update preferences of the user based at least on the selection of the event pair and not the selection of the second event pair.

8. A method for providing process optimization, the method comprising:
identifying an event in an event log, the event comprising a resource and an activity;
identifying resources from a plurality of resources that are associated with the activity in the event;
creating a plurality of event pairs, the plurality of event pairs comprising the activity from the event and a different one of the resources that is associated with the activity;
for the plurality of event pairs:
converting the activity into an activity latent vector;
converting the resource into a resource latent vector; and
generating a score value by combining the resource latent vector and the activity latent vector;
comparing score values from the plurality of event pairs; and
based on the comparing, recommending an event pair from the plurality of event pairs for the event.

9. The method of claim 8, wherein the data for the plurality of resources comprises features for the plurality of resources and historic data for the plurality of resources and corresponding interactions with activities.

10. The method of claim 8, wherein the resource latent vector is based at least on features corresponding to the resource.

11. The method of claim 10, wherein the activity latent vector is based at least on features corresponding to the activity.

12. The method of claim 8, further comprising:
accessing previous event pair selections of a user;
based on the previous event pair selections, determining preferences of the user; and
based at least on the determined preferences, recommending the event pair from the plurality of event pairs for the event.

13. The method of claim 8, wherein the computer-readable medium further stores instructions that cause the processor to perform the following operations:
based on the comparing, recommending the event pair and a second event pair from the plurality of event pairs for the event;
receiving, from a user, a selection of the event pair;
based on the selecting of the event pair, assigning the event pair to a corresponding process; and based at least on the selection of the event pair, updating preferences of the user based at least on the selection of the event pair and not the selection of the second event pair.

14. The method of claim 13, wherein the preferences of the user comprise preferences received from the user and preferences learned during a training period.

15. A computer storage media having computer-executable instructions stored thereon, which, on execution by a computer, cause the computer to perform operations comprising:
   identifying an event in an event log, the event comprising a resource and an activity;
   identifying resources from a plurality of resources that are associated with the activity in the event;
   creating a plurality of event pairs, event pairs comprising the activity from the event and a different one of the resources that is associated with the activity;
   for the plurality of event pairs:
      converting the activity into an activity latent vector;
      converting the resource into a resource latent vector; and
      generating a score value by combining the resource latent vector and the activity latent vector;
   comparing score values from the plurality of event pairs; and
   based on the comparing, recommending an event pair from the plurality of event pairs for the event.

16. The computer storage device media of claim 15, wherein the data for the plurality of resources comprises features for the plurality of resources and historic data for the plurality of resources and corresponding interactions with activities.

17. The computer storage device media of claim 16, wherein the resource latent vector is based at least on features corresponding to the resource, and wherein the activity latent vector is based at least on features corresponding to the activity.

18. The computer storage device media of claim 15, wherein the computer-executable instructions further cause the computer to perform operations comprising: accessing previous event pair selections of a user;
   based on the previous event pair selections, determining preferences of the user; and
   based at least on the determined preferences, recommending the event pair from the plurality of event pairs for the event.

19. The computer storage device media of claim 15, wherein the computer-executable instructions further cause the computer to perform operations comprising: based on the comparing, recommending the event pair and a second event pair from the plurality of event pairs for the event;
   receiving, from a user, a selection of the event pair;
   based on the selecting of the event pair, assigning the event pair to a corresponding process; and
   based at least on the selection of the event pair, updating preferences of the user based at least on the selection of the event pair and not the selection of the second event pair.

20. The computer storage device media of claim 15, wherein the preferences of the user comprise preferences received from the user and preferences learned during a training period.

* * * * *